J. M. JACKSON.
SHOCK ABSORBER.
APPLICATION FILED FEB. 26, 1913.
1,086,182.  Patented Feb. 3, 1914.
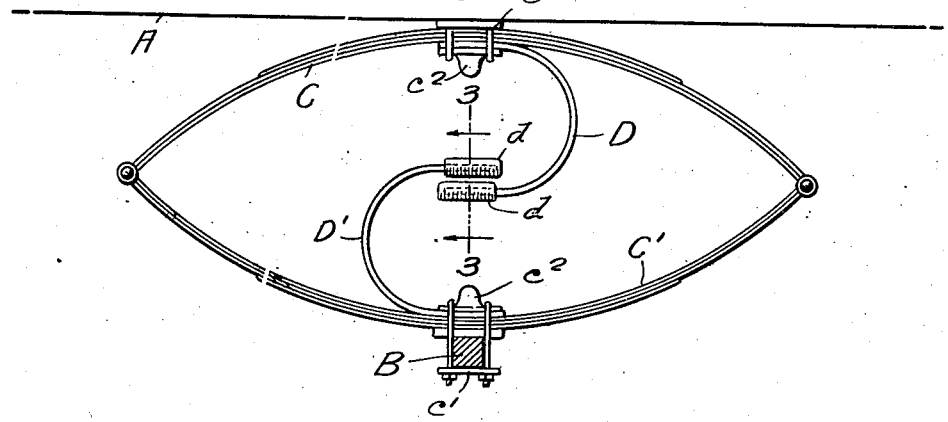
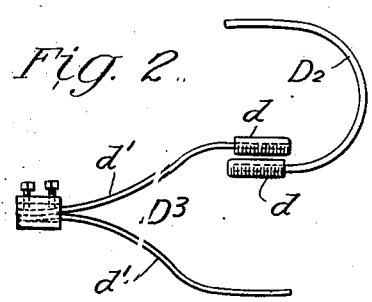
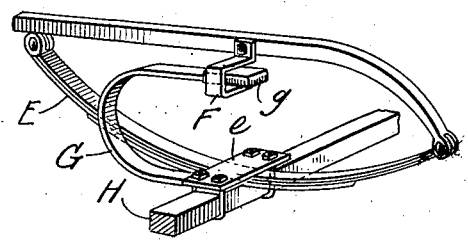
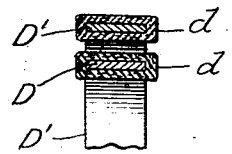
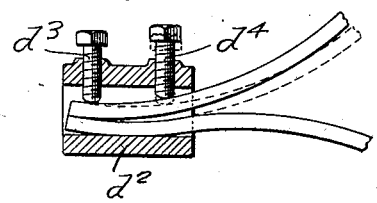
WITNESSES
INVENTOR
JAMES M. JACKSON
BY
ATTORNEYS

UNITED STATES PATENT OFFICE.

JAMES MADISON JACKSON, OF PARKERSBURG, WEST VIRGINIA.

SHOCK-ABSORBER.

1,086,182.　　　　Specification of Letters Patent.　　Patented Feb. 3, 1914.

Application filed February 26, 1913. Serial No. 750,754.

*To all whom it may concern:*

Be it known that I, JAMES M. JACKSON, a citizen of the United States, and a resident of Parkersburg, in the county of Wood and State of West Virginia, have invented certain new and useful Improvements in Shock-Absorbers, of which the following is a specification.

My present invention relates to shock absorbers for vehicles, and the primary object of my invention is to provide an arrangement in which, under normal road conditions, there is no engagement of any parts and therefore no noise and no necessity for lubrication.

A further object of my invention is to provide an arrangement consisting solely of spring members, the relation and relative action of which is such as to absorb the shock of movement of a wagon body in both directions.

With the above in mind, my invention resides in the features of construction and arrangement as illustrated in the accompanying drawing, in which—

Figure 1 is a sectional side elevation illustrating my improved shock absorber in position with a full elliptical spring between the axle and body of a wagon. Fig. 2 is a side elevation illustrating a slightly modified form of my invention in which one of the spring members is in two parts for the purposes of adjustment. Fig. 3 is a detail vertical section taken substantially on the line 3—3 of Fig. 1. Fig. 4 is a similar section taken through the connecting box illustrated in Fig. 2. Fig. 5 is a perspective view of an arrangement consisting of a modified form of my invention adapting the same to semi-elliptical springs.

Referring now particularly to Figs. 1 and 2, the body of a vehicle, the lower line of which is indicated at A in Fig. 1, is supported above the axle B by means of a full elliptical spring, the upper portion C of which is secured to the body by means of a clip $c$, and the lower portion C' of which is secured to the axle by a clip $c'$.

In accordance with my invention, I provide a shock absorber comprising a pair of substantially U-shaped flat spring members D and D', oppositely or reversely disposed with relation to one another and superposed one upon the other centrally of the elliptical body spring. The upper member D has its upper end rigidly connected to the body of the wagon or other vehicle by means of the clip $c$ before mentioned, the lower member D' has its lower end similarly connected to the axle B by means of the clip $c'$.

The contiguous inner free ends of the spring members D and D', are lapped and normally spaced from contact as shown in the figures above mentioned, each of these ends being provided with buffers $d$ by which noise is eliminated when these ends of the spring come together. The clips $c$ and $c'$ are provided with cushions $c^2$ for the same purpose, these cushions receiving the spring ends thereagainst when the body and the axle B move toward one another and the spring ends coming together when these vehicle parts rebound away from one another.

It is to be understood that under normal road conditions, the shock absorbing members do not come into operation, the body of the vehicle being supported with sufficient elasticity by means of the usual body springs. In order, therefore, to vary the space between the lapped free ends of the spring members, I preferably provide one of them in two parts as particularly illustrated in Figs. 2 and 4 in which one spring member is indicated at $D^2$ and the other at $D^3$, the latter being in two parts $d'$ having laterally projecting connected ends which are concave and disposed within a connecting boxing $d^2$, this boxing being provided with set-screws $d^3$ and $d^4$ which work therethrough and into engagement with the said ends of the spring parts in order that their relative inclination may be adjusted and thus the free inner end of the upper part $d'$ may be adjusted toward and away from the free inner end of the upper spring member $D^2$.

In Fig. 5 I have shown a somewhat different arrangement in order to adapt my invention to use in connection with vehicles employing semi-elliptical springs such as indicated at E in said figure, the adjacent portion of the body being provided with a rigid laterally extending U-shaped bracket F and a single shock absorbing member G in the form of a flat U-shaped spring. This spring is connected by means of the clip $e$ to the axle H, the free end of the spring being provided with a pad or buffer $g$ and being disposed between the upper and lower portions of the bracket F just mentioned. In this manner, the arrangement will be equally noiseless both during and between operations, the parts being normally out of contact as in the arrangement shown in the other figures. When the body tends to move in either direction, the free padded end of the spring member G will contact with the respective portion of the bracket F.

Thus from the foregoing, it will be further seen that in view of its noiseless operation, its simplicity of structure and the further fact that the parts are normally out of contact, either form of my improved shock absorber possesses attributes particularly recommending the same to use in connection with motor vehicles of various types.

I claim:

1. The combination with a vehicle having a body spring, of an engaging member having spaced portions and a substantially U-shaped flat spring member secured at one end and having its opposite free end disposed between the said spaced portions of the engaging member, whereby to contact therewith in operation and to spring past the same under excessive strain.

2. The combination with a vehicle, of a shock absorber comprising superposed spring arms normally having lapped contiguous free ends out of contact and adapted to engage one another in operation, for the purpose described.

3. The combination with a vehicle, of a shock absorber comprising a pair of spring members having lapped contiguous free ends normally spaced from one another, one of said members having connection with the body of the vehicle and the other member having connection with the vehicle axle.

4. The combination with a vehicle, of a shock absorber comprising a pair of spring arms reversely curved with respect to one another and respectively connected to the vehicle body and its axles, said spring arms having lapped inner free ends normally spaced from contact with one another.

5. The combination with a vehicle, of a shock absorber, comprising a pair of reversely disposed and relatively movable U-shaped flat spring members having lapped inner free ends in alinement and normally spaced from contact with one another, one of which members is carried by the vehicle body and the other of which is carried by the vehicle axle.

6. The combination with a vehicle, of a shock absorber comprising a pair of reversely disposed and relatively movable U-shaped flat spring members having their contiguous ends in alinement and normally spaced from contact with one another, one of which members is carried by the body and the other by the axle of the vehicle, said spring members being adapted to engage one another upon relatively opposite movement in one direction, and cushions carried by the vehicle body and axle and with which said springs are adapted to engage upon relatively opposite movement in the other direction.

7. The combination with a vehicle, of a shock absorber comprising a pair of spring arms reversely curved with respect to one another and respectively connected to the vehicle body and its axle, said arms having lapped contiguous ends normally spaced from contact with one another, and means whereby the end of one of said spring arms may be adjusted toward and away from the respective end of the other spring arm to vary the space normally existing between said contiguous ends.

8. The combination with a vehicle, of a shock absorber comprising a pair of reversely disposed and relatively movable U-shaped flat spring members having their contiguous ends in alinement and normally spaced from contact with one another, one of which members is carried by the body and the other by the axle of the vehicle, said springs being adapted to engage one another upon relatively opposite movement in one direction, one of said springs being in two parts having laterally bent adjacent ends, a connecting box disposed on said laterally bent ends, and set-screws working in the box and adjustably engaging the said ends of the spring parts, for the purpose described.

JAMES MADISON JACKSON.

Witnesses:
A. L. NELSON,
ALBERT M. STILES.

---

Copies of this patent may be obtained for five cents each, by addressing the "Commissioner of Patents, Washington, D. C."